(12) United States Patent
Kimmelmann et al.

(10) Patent No.: US 7,768,894 B2
(45) Date of Patent: Aug. 3, 2010

(54) HOLOGRAPHIC STORAGE MEDIUM

(75) Inventors: Stefan Kimmelmann, VS-Pfaffenweiler (DE); Christof Ballweg, VS-Villingen (DE); Uwe Reschke, Horb am Neckar (DE)

(73) Assignee: Thomson Licensing, Boulogne-Billancourt (FR)

( * ) Notice: Subject to any disclaimer, the term of this patent is extended or adjusted under 35 U.S.C. 154(b) by 815 days.

(21) Appl. No.: 11/709,651

(22) Filed: Feb. 22, 2007

(65) Prior Publication Data
US 2007/0201340 A1    Aug. 30, 2007

(30) Foreign Application Priority Data
Feb. 27, 2006  (EP) .................................. 06110433

(51) Int. Cl.
G11B 7/00    (2006.01)
(52) U.S. Cl. .................................... 369/103; 369/275.4
(58) Field of Classification Search ............... 369/103, 369/275.4; 359/22–24, 3
See application file for complete search history.

(56) References Cited

U.S. PATENT DOCUMENTS

| 7,307,769 B2* | 12/2007 | Ogasawara ................. 359/24 |
| 2005/0237896 A1 | 10/2005 | Tachibana et al. |

FOREIGN PATENT DOCUMENTS

| CN | 1672195 A | 9/2005 |
| EP | 1460622 A | 9/2004 |
| EP | 1471507 A | 10/2004 |

OTHER PUBLICATIONS

Search report dated May 29, 2006.

* cited by examiner

*Primary Examiner*—Thang V Tran
(74) *Attorney, Agent, or Firm*—Robert D. Shedd; Jeffrey M. Navon

(57) ABSTRACT

The present invention relates to a holographic storage medium, and more specifically to a holographic storage medium with an improved servo architecture for precise positioning of a laser beam in radial, axial and tangential direction. According to the invention, a holographic storage medium includes a holographic layer for storing holograms and a servo layer with a track structure for positioning a light beam for reading and/or recording of a hologram relative to the holographic recording medium, wherein the track structure includes a pack of two or more tracks.

7 Claims, 5 Drawing Sheets

HOLOGRAPHIC STORAGE MEDIUM

This application claims the benefit, under 35 U.S.C. §119 of European Patent Application 06110433.7, filed Feb. 27, 2006.

FIELD OF THE INVENTION

The present invention relates to a holographic storage medium, and more specifically to a holographic storage medium with an improved servo architecture for precise positioning of a laser beam in radial, axial and tangential direction.

BACKGROUND OF THE INVENTION

One concept for increasing the capacity of optical storage media is to use holographic data storage. In this case the whole volume of the holographic storage medium is used for storing information, not just a few layers as for conventional optical storage media. In holographic data storage digital data are stored by recording the interference pattern produced by the superposition of two coherent laser beams, where one beam is modulated by a spatial light modulator and carries the information to be recorded in the form of data pages. One advantage of holographic data storage is the possibility to store multiple data in the same volume, e.g. by changing the angle between the two beams or by using shift multiplexing, etc.

Data storage on a holographic storage medium requires a very precise servo concept with regard to focus, track and tangential direction, in order to be able to write or read a hologram at a stable position. For a holographic disk a servo format similar to a DVD (Digital Versatile Disk) could be used for the servo function. For example, in EP1310952 Horimai et al. disclose the concept of having a substrate similar to a DVD as a guiding structure underneath a holographic disk medium. In this case a servo light beam is focused onto the holographic disk medium with the same objective lens as the holographic beam, i.e. the light beam used for holographic recording or readout. When the holographic and the servo beams are fixed relatively to each other, the servo beam can act as a reference for the beam used for holographic recording. The servo beam is focused onto the guiding structure, whereas the holographic beam is focused as appropriate for the chosen holographic recording process.

With the DVD servo format every track has two neighboring tracks at a distance of 0.74 μm. This repetitive groove and land change causes a diffraction effect, which perturbs the reading and writing operation. In addition, the current optical designs of holographic storage systems require a minimum distance of at least 10 μm from one hologram to the next when information is stored as data pages. This means that after each rotation of the holographic disk a track jump over multiple tracks has to take place. This makes a real continuous recording impossible and complicates the addressing of the holograms.

SUMMARY OF THE INVENTION

It is an object of the invention to propose a holographic storage medium with an improved servo architecture.

According to the invention, this object is achieved by a holographic storage medium with a holographic layer for storing holograms and a servo layer with a track structure for positioning a light beam for reading and/or recording of a hologram relative to the holographic recording medium, wherein the track structure includes a pack of two or more tracks.

The new servo layer architecture supports and improves the focus, track and tangential positioning of a laser spot on an storage medium for holographic recording. Tangential positioning is to be understood as a positioning in track direction. The track structure is spiral or concentric as usual, but in difference to the DVD format uses a pack of tracks. The packs of tracks are advantageously separated by mirror areas. One pack of track contains two or more tracks, preferably two or three. The tracks preferably consist of grooves, which are separated by lands, or of lands, which are separated by grooves. A change between the two possibilities just means a polarity change of the signals. The distance between one pack of tracks to the next pack, i.e. the track structure pitch, is not the width of one track like in the DVD format, but is defined according to the requirements of the holographic medium and the final capacity that is to be achieved on the holographic storage medium. Advantageously, the pitch is adapted to the distance between adjacent holograms. For current approaches this distance is around 10 μm.

The servo layer architecture achieves a trade-off between reducing the number of servo tracks to a minimum, as every track increases the diffraction effect, and enabling reliable tracking with the known tracking methods. The servo layer architecture is independent from the overall architecture of the holographic storage medium.

Additional servo marks and an addressing scheme are used to allow a reliable laser spot positioning in tangential direction. The servo marks are preferably located in a central land or groove of the pack of tracks. The address information is either located in the central land or groove of the pack of tracks as well, or in one or more of the outer grooves or lands of the pack of tracks.

According to a further aspect of the invention, to overcome the problems associated with the DVD servo format a spiral track with an adapted track pitch is used. The track pitch preferably is about 10 μm. Though this solution is not applicable for some of the known tracking methods, e.g. differential push-pull tracking, the minimum number of tracks in the servo layer and hence a minimized perturbing diffraction effect is achieved. At low rotation speeds address information and servo marks contained in the tracks would no longer be in a high frequency range compared to the tracking error signal. Therefore, the tracking error signal could be superposed by this information, which should be compensated by an adapted signal processing. This solution is especially advantageous when the servo layer is arranged above the hologram layer.

BRIEF DESCRIPTION OF THE DRAWINGS

For a better understanding the invention shall now be explained in more detail in the following description with reference to the figures. It is understood that the invention is not limited to this exemplary embodiment and that specified features can also expediently be combined and/or modified without departing from the scope of the present invention. In the figures.

DETAILED DESCRIPTION OF PREFERRED EMBODIMENTS

Figure 1:
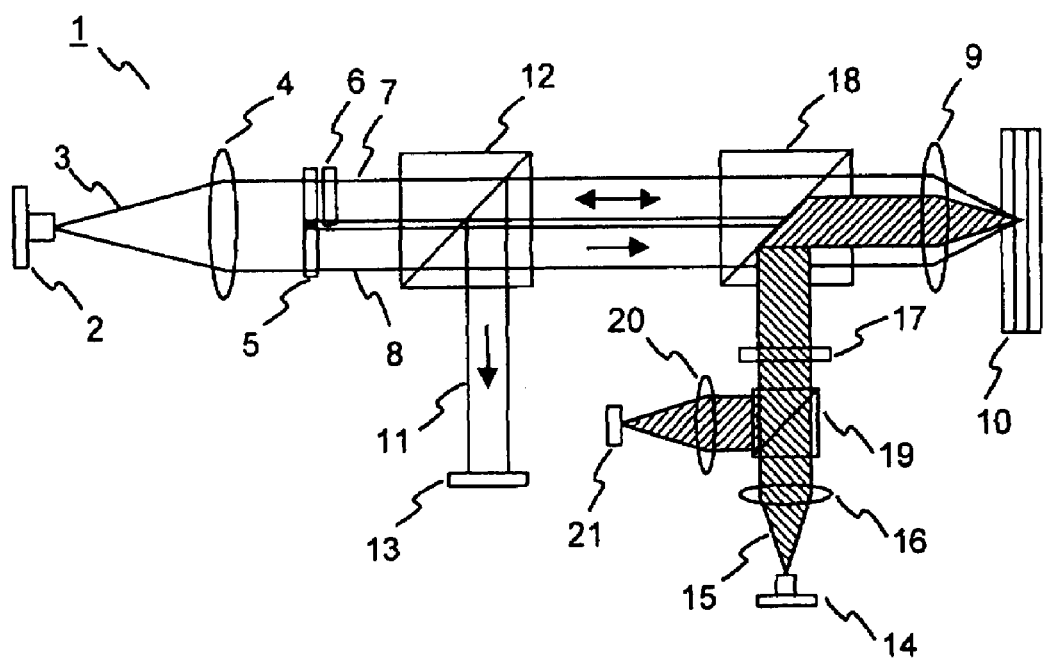
FIG. 1 schematically depicts a holographic pickup used in a holographic storage system.

In holographic data storage digital data are stored by recording the interference pattern produced by the superposition of two coherent laser beams. An exemplary setup of a holographic pickup 1 for use in a holographic storage system is shown in FIG. 1. A source of coherent light, e.g. a laser diode 2, emits a light beam 3, which is collimated by a collimating lens 4. The light beam 3 is then divided into two separate light beams 7, 8. In the example the division of the light beam 3 is achieved using a first beam splitter 5. However, it is likewise possible to use other optical components for this purpose. A spatial light modulator (SLM) 6 modulates one of the two beams, the so called "object beam" 7, to imprint a 2-dimensional data pattern. Both the object beam 7 and the further beam, the so called "reference beam" 8, are focused into a holographic storage medium 10, e.g. a holographic disk, by an objective lens 9. At the intersection of the object beam 7 and the reference beam 8 an interference pattern appears, which is recorded in a photo-sensitive layer of the holographic storage medium 10.

The stored data are retrieved from the holographic storage medium 10 by illuminating a recorded hologram with the reference beam 8 only. The reference beam 8 is diffracted by the hologram structure and produces a copy of the original object beam 7, the reconstructed object beam 11. This reconstructed object beam 11 is collimated by the objective lens 9 and directed onto a 2-dimensional array detector 13, e.g. a CCD-array, by a second beam splitter 12. The array detector 13 allows to reconstruct the recorded data.

In order to simplify positioning of the object and reference beams 7, 8 relative to the holographic storage medium 10, the holographic storage medium 10 is provided with a-servo layer. The holographic pickup 1 includes a further light source 14 for generating a servo light beam 15. The servo light beam 15 is collimated by a further collimating lens 16 and coupled into the beam path of the object and reference beams 7, 8 by a third beam splitter 18. The servo light beam 15 is then focused onto the servo layer by the objective lens 9. The light beam reflected by the servo layer is again collimated by the objective lens 9 and directed towards a detector 21 by the third beam splitter 18 and a fourth beam splitter 19. A lens 20 focuses the reflected light beam onto the detector 21. The servo light beam 15 advantageously has a different wavelength than the object and the reference beams 7, 8. In this case a wavelength selective beam splitter can be used as the third beam splitter 18. Preferably, the servo light beam 15 in addition is a linearly polarized light beam, which allows to implement the fourth beam splitter 19 as a polarization selective beam splitter. The path of the servo light beam 15 then includes a quarter wave plate 17 for rotating the direction of polarization of the reflected servo light beam 15 by 90 degrees relative to the direction of polarization of the servo light beam 15 emitted by the light source 14.

As described above, the servo light beam 15 is focused onto the holographic storage medium 10 with the same objective lens 9 as the light beams 7, 8 used for holographic recording. As the holographic light beams 7, 8 and the servo light beam 15 are fixed relatively to each other, the servo light beam 15 acts as a reference for the light beam 7, 8 used for holographic recording. Due to their different wavelengths and their different collimation the holographic light beams 7, 8 and the servo light beam 15 have different foci.

Figure 2:
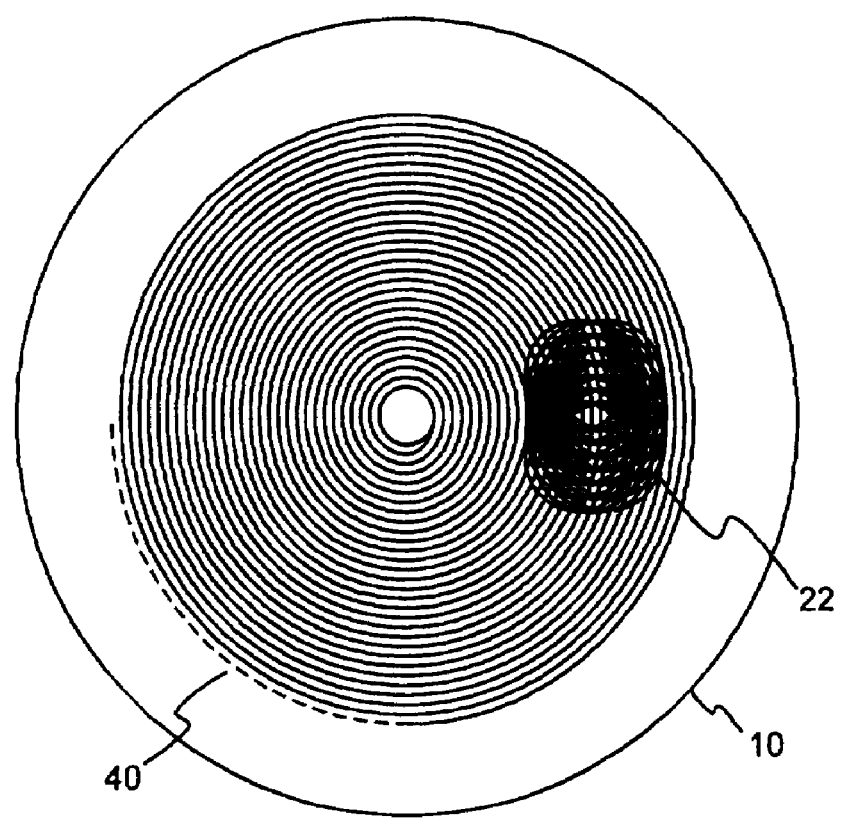
FIG. 2 depicts a holographic storage medium with shift-multiplexed holograms.

In FIG. 2 a top view of a holographic storage medium 10 is shown. The holographic storage medium 10 has a track structure 40. Overlapping holograms 22 are recorded on the holographic storage medium 10 using shift-multiplexing. As can be understood from the figure, the track structure 40 preferably enables a radial, an axial, and a tangential position control. The axial and radial adjustment of the position of the holographic beams 7, 8 relative to the holographic storage medium 10 is achieved by an actuator (not shown), which moves the objective lens 9 accordingly. As for the tangential adjustment, a precise spindle motor, e.g. a stepper or piezo motor, or any other kind of mechanical concept to move either the holographic storage medium 10 or the holographic beams 7, 8 in tangential direction may be used.

Figure 3:
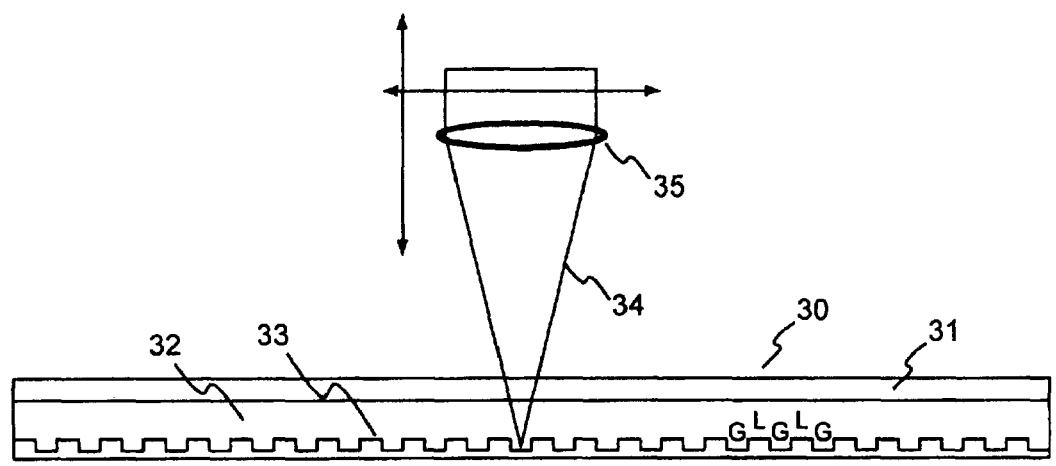
FIG. 3 shows a schematic cross sectional view of a digital versatile disk.

For the servo function the standard track format of a DVD is often used. The layer architecture of a DVD 30 is shown schematically in FIG. 3. A cover layer 31 is located above a DVD layer 32. The DVD layer 32 has a track structure 33 with grooves G and lands L. For playback of the DVD a laser beam 34 with a wavelength between 635 nm and 650 nm is focused onto a track with an objective lens 35. The objective lens 35 is movable in radial and axial direction, as illustrated by the arrows. No tangential positioning is possible. Every track has two directly neighboring tracks at a distance of 0.74 µm.

Figure 4:
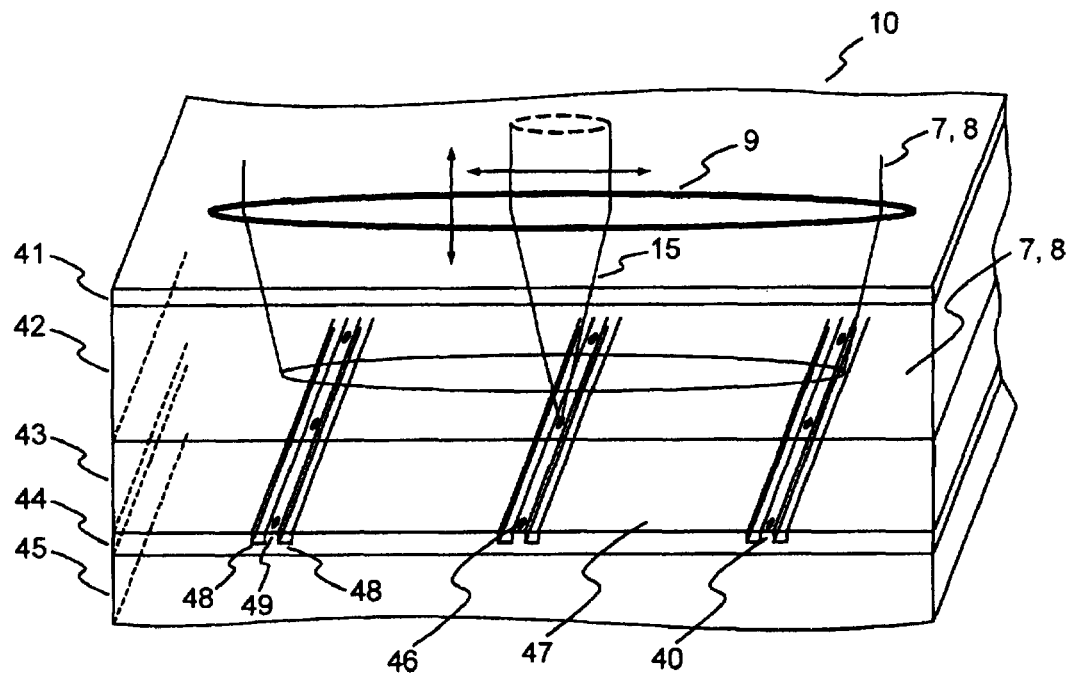
FIG. 4 shows a schematic 3-dimensional view of a holographic storage medium according to the invention.

A schematic 3-dimensional view of a holographic storage medium 10 according to the invention is shown in FIG. 4. The holographic storage medium 10 has a holographic layer 42 and a servo layer 44. The servo light beam 15 is focused onto a track structure (guiding structure) 40 of the servo layer 44 by the objective lens 9, whereas the holographic light beams 7, 8 are focused into the holographic layer 42 as appropriate for the chosen holographic recording process. All light beams 7, 8, 15 have an essentially circular cross section. The servo layer 44 is arranged above a substrate 45 and separated from the holographic layer 42 by an intermediate layer 43, which is transparent for the wavelength of the servo light beam 15. The intermediate layer 43 is either reflective or transparent for the wavelength of the holographic light beams 7, 8. When the latter is the case, the servo layer 44 needs to be reflective both for the wavelength of the servo light beam 15 and the wavelength of the holographic light beams 7, 8. The intermediate layer 43 fills the track structure 40 of the servo layer 44 to obtain a planar surface and increases the distance between the holographic layer 42 and the servo layer 44. Located above the holographic layer 42 is a cover layer 41 for protecting the holographic layer 42. It is likewise possible to place the servo layer 44 above the holographic layer 42, separated by an adapted intermediate layer 43. In this case, however, the distortions of the holographic light beams 7, 8 caused by the servo layer 44 have to be compensated, e.g. by increasing the distance between the holographic layer 42 and the servo layer 44 such that the holographic beams 7, B have a comparatively large diameter when passing the servo layer 44. The track structure 40 of the servo layer 44 uses a spiral pack of two tracks, in this example two grooves 48 separated by a land 49. It is likewise possible to use concentric packs of tracks. The track structure pitch is adapted to the distance between adjacent holograms. Located between two neighboring packs of tracks is a mirror area 47. The land 49 of a pack of tracks includes a plurality of servo marks 46. Preferably the track phase depth does not exceed $\pi/4$ with regard to the wavelength of the servo light beam 15 to obtain an optimum servo signal.

Figure 5:
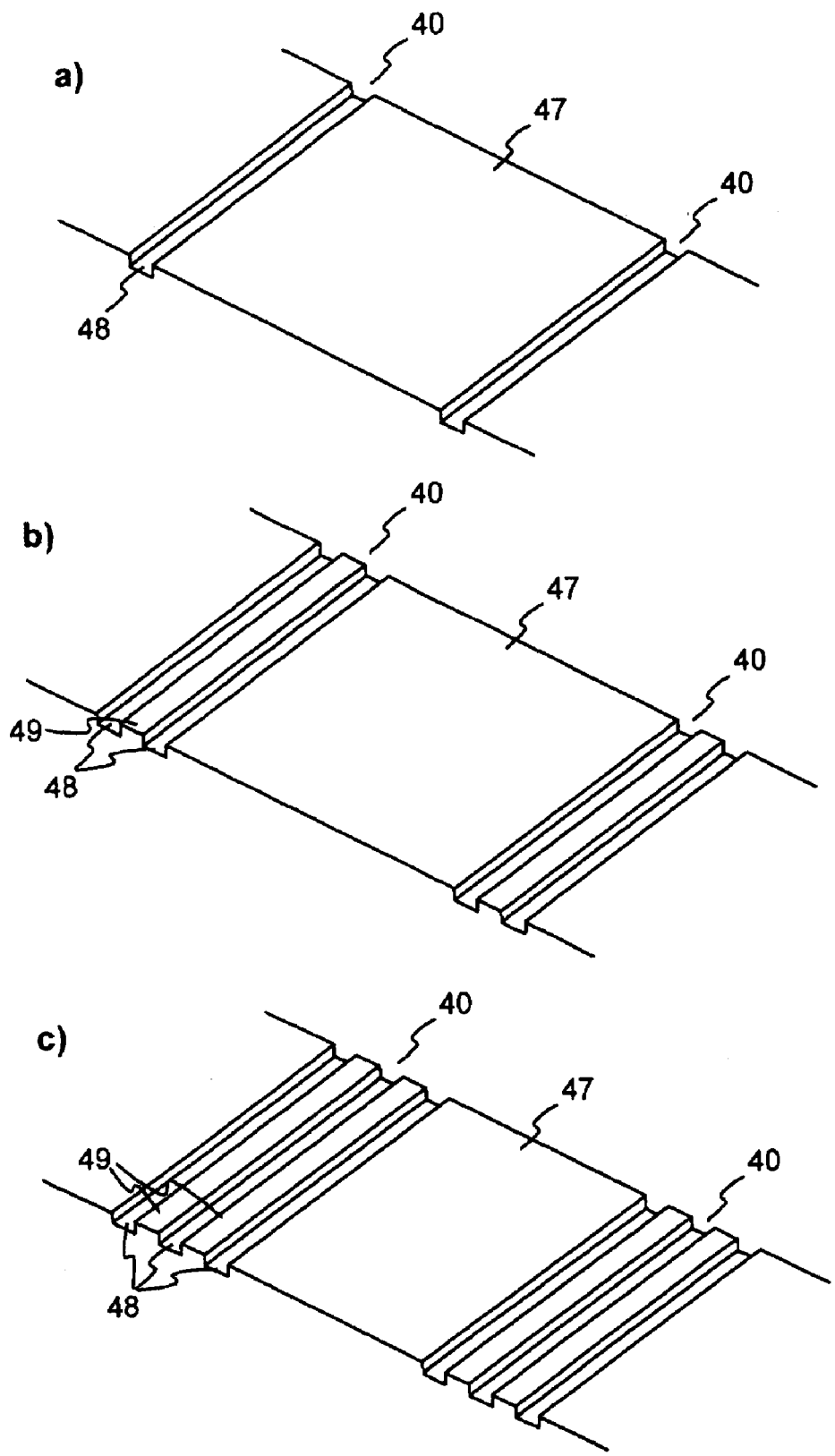
FIG. 5 depicts three different types of servo tracks of a holographic storage medium.

In the example in FIG. 4 the track structure 40 uses a spiral pack of two tracks, i.e. two grooves 48 separated by a land 49. FIG. 5 depicts a detail view of this track structure and two further track structures. The simplest track structure is shown in FIG. 5a). This track structure 40 uses a single groove 48 with a much larger gradient angle per revolution than the DVD format, i.e. a larger track pitch. Consequently, a large mirror region 47 is located between the tracks. This track structure 40 has the advantage that the number of grooves 48 in the servo layer 44 is minimized, which reduces the diffraction effects to a minimum. However, with such a track structure 40 not all known tracking techniques can be used.

FIG. 5b) shows the same track structure 40 as in the example of FIG. 4. The track structure 40 uses a spiral with a double track, i.e. two grooves 48 separated by a land 49. This structure is especially useful for differential push-pull tracking, because for this tracking method a side beam has to be adjusted to the grooves 48 besides the land 49. FIG. 5c) shows a similar track structure 40 using a triple track, i.e. three grooves 48 separated by two lands 49. In both cases all known tracking error generation methods can be used. At the same time a large mirror area 47 is obtained between adjacent packs of tracks. Therefore, the influences of the diffraction effects on the optical reading and writing performance are greatly reduced. A further advantage of the multiple-groove track structures becomes apparent at very low rotation speeds of the holographic storage medium 10. At very low rotation speeds the address information and the servo marks 46 are no longer in a very high frequency range. In the worst case the generated tracking error signal is superposed by this information and a stable radial positioning is no longer ensured with a single-groove track structure.

Figure 6:
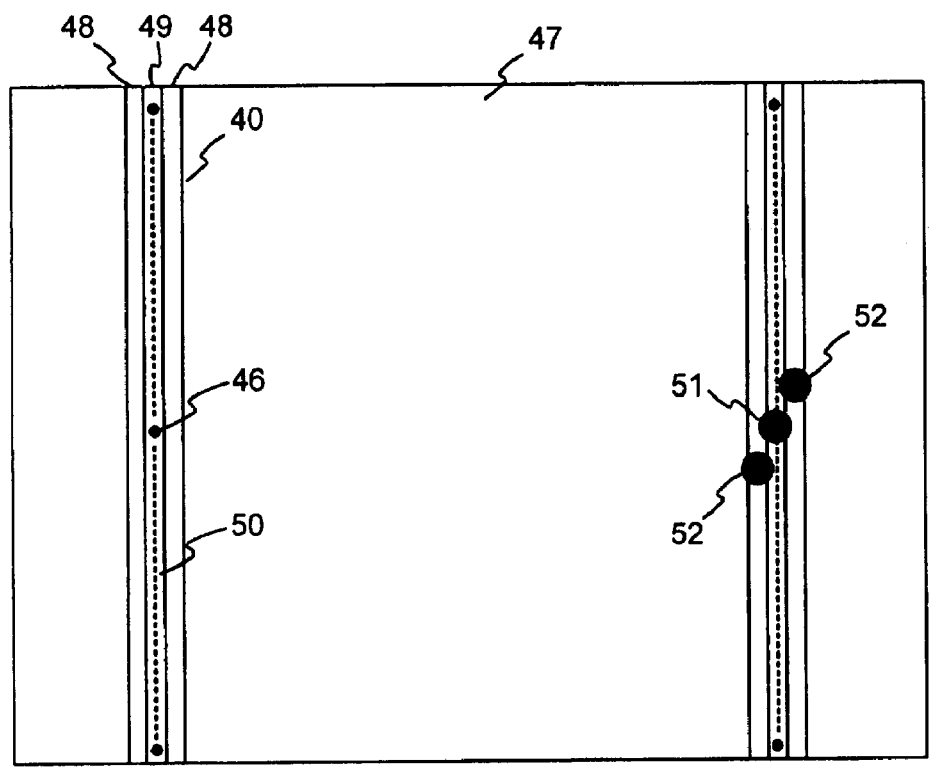
FIG. 6 illustrates a top view of a first type of servo layer of a holographic storage medium.
Figure 7:
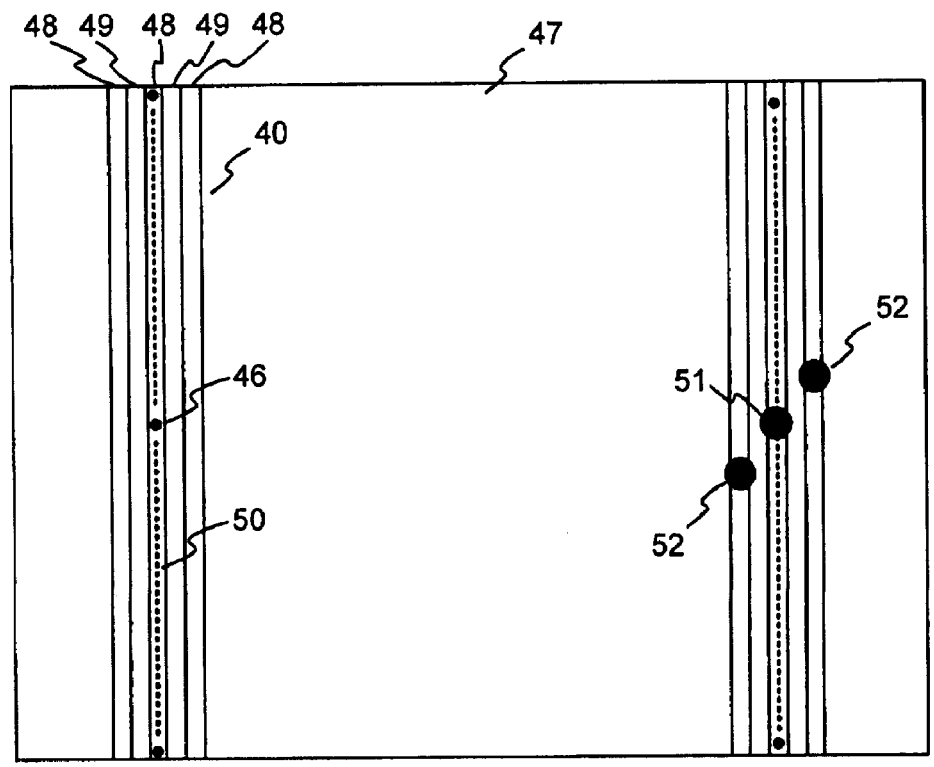
FIG. 7 illustrates a top view of a second type of servo layer of a holographic storage medium.
Figure 8:
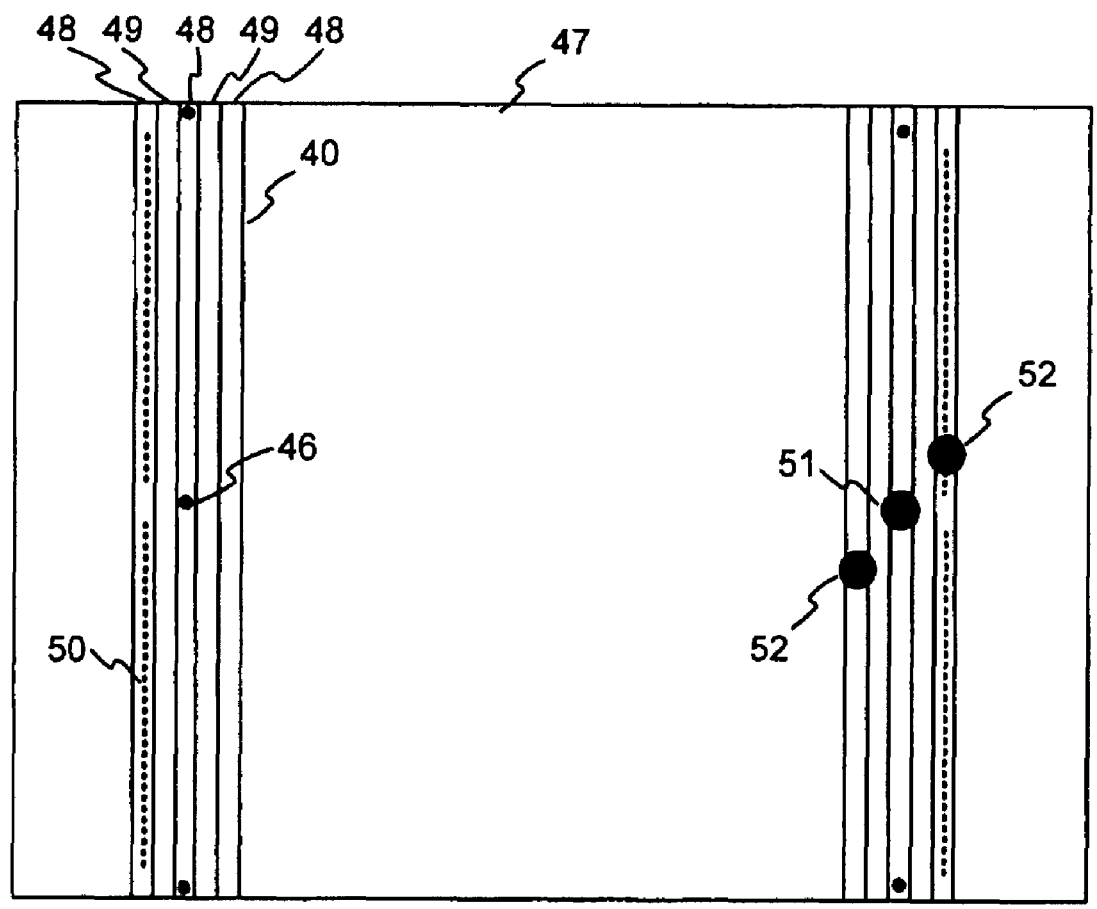
FIG. 8 illustrates a top view of a third type of servo layer of a holographic storage medium.

The use of address information with different types of servo layers is illustrated in FIGS. 6 to 8. In all three figures a center beam 51 and two side beams 52 are used for tracking, as is the case for differential push-pull tracking or three-beam tracking, where the side beams 52 are adjusted to hit the middle of the grooves 48 next to a central land 49 or central groove 48 scanned by the center beam 51. Adjustment of the distance between the side beams 52 and the center beam 51 may be done with an additional grating. Other tracking methods may be employed with the servo format as well.

In FIG. 6 a double track 40 is used, where servo marks 46 and address information 50 are located on the central land 49. The side beams 52, which generate the tracking error signal for a tracking servo, hit the grooves 48 beside the land 49. The center beam 51 hits the central land 48. In this case the servo signal generation is not influenced by the servo marks 46 and the address information 50.

In FIG. 7 a triple track 40 is used, where servo marks 46 and address information 50 are located in the central groove 48. The side beams 52 hit the grooves 48 beside the outer lands 49. The center beam 51 hits the central groove 49. Again the servo signal generation is not influenced by the servo marks 46 and the address information 50.

FIG. 8 shows a servo layer 44 with a triple track 40, where the servo marks 46 are located in the central groove 48, while the address information 50 is located in one or both of the outer grooves 48. In this case the address information is read by either or both of the side beams 52.

The servo marks 46 and the address information 50 are used for a tangential positioning of the servo light beam 15, and hence of the holographic light beams 7, 8, relative to the holographic storage medium 10. The tangential positioning is necessary because during reading and writing of each hologram the laser spot has to be in a well-defined position in the holographic storage medium 10. This means that the laser spot has to follow the servo marks 46 on the holographic storage medium 10 in all three directions. A special signal processing is used which delivers a tangential error signal generated from the address information 50 and the servo marks 26. Either the spindle motor or a system for moving the laser spot in tangential direction uses this tangential error signal to control the laser spot on the holographic storage medium 10.

Though the invention has been described with reference to holographic storage media, it is likewise applicable to other types of servo positioning systems, where a very high precision in axial, radial and tangential direction is necessary.

What is claimed, is:

1. Holographic storage medium with a holographic layer for storing holograms and a servo layer with a track structure for positioning a light beam for reading and/or recording of a hologram relative to the holographic recording medium, wherein the track structure includes a group of two or more tracks, the tracks within the group of tracks having a track pitch, and wherein adjacent groups of tracks are separated by a mirror area having a width that is larger than said track pitch.

2. Holographic storage medium according to claim 1, wherein the group of two or more tracks includes two or more grooves separated by lands or two or more lands separated by grooves.

3. Holographic storage medium according to claim 1, wherein the track structure includes spiral or concentric groups of tracks.

4. Holographic storage medium according to claim 1, wherein the pitch of the group of tracks is a distance between adjacent holograms.

5. Holographic storage medium according to claim 1, wherein servo marks are located in a central track of the group of tracks.

6. Holographic storage medium according to claim 1, wherein address information is located in a track of the group of tracks.

7. Holographic storage medium according to claim 1, wherein address information is located in one or more outer tracks of the group of tracks.

* * * * *